(12) United States Patent
Lee

(10) Patent No.: US 6,786,729 B2
(45) Date of Patent: Sep. 7, 2004

(54) COGNITIVE MATCHING SKILL LEARNING AID AND RELATED METHODS

(76) Inventor: Melinda L. Lee, 1801 Abrams Rd., Eustis, FL (US) 32726

( * ) Notice: Subject to any disclaimer, the term of this patent is extended or adjusted under 35 U.S.C. 154(b) by 0 days.

(21) Appl. No.: 10/174,216

(22) Filed: Jun. 18, 2002

(65) Prior Publication Data

US 2003/0232320 A1 Dec. 18, 2003

(51) Int. Cl.$^7$ .............................................. G09B 1/00
(52) U.S. Cl. ...................................... 434/159; 434/167
(58) Field of Search ................................ 434/159, 167, 434/170, 172; 273/273, 296, 302

(56) References Cited

U.S. PATENT DOCUMENTS

| | | | |
|---|---|---|---|
| 1,682,686 A | | 8/1928 | Rutherford |
| 1,904,723 A | * | 4/1933 | Fisher .......................... 434/167 |
| D204,390 S | | 4/1966 | Bodicky ...................... D33/14 |
| 3,654,712 A | * | 4/1972 | Bagdasar .................... 434/170 |
| 3,766,668 A | * | 10/1973 | Vogel .......................... 434/403 |
| 4,262,431 A | * | 4/1981 | Darnell ........................ 434/170 |
| 4,286,952 A | * | 9/1981 | Roche ......................... 434/259 |
| 4,345,902 A | * | 8/1982 | Hengel ........................ 434/170 |
| 4,358,278 A | * | 11/1982 | Goldfarb ..................... 434/337 |
| 4,966,366 A | | 10/1990 | Mercado-Torres ........... 23/1 R |
| 5,054,789 A | * | 10/1991 | Pellerin ....................... 273/288 |
| 5,066,234 A | * | 11/1991 | LeDesma ..................... 434/205 |
| 5,509,844 A | | 4/1996 | Poirier et al. ................. 446/71 |
| 5,743,740 A | | 4/1998 | Visser et al. ................. 434/128 |
| 5,782,185 A | | 7/1998 | Frahm et al. ................. 108/25 |
| 5,863,204 A | * | 1/1999 | Fulton ......................... 434/172 |
| 6,070,873 A | * | 6/2000 | Perkins ....................... 273/292 |
| 6,099,318 A | * | 8/2000 | McLeod et al. ............. 434/129 |
| 6,152,740 A | | 11/2000 | Corrado ...................... 434/172 |
| 6,533,585 B2 | * | 3/2003 | Possidento .................. 434/298 |

* cited by examiner

*Primary Examiner*—Kurt Fernstrom
(74) *Attorney, Agent, or Firm*—Allen, Dyer, Doppelt, Milbrath & Gilchrist, P.A.

(57) ABSTRACT

A cognitive matching skill learning aid may include a base having a plurality of different object images thereon and a respective matching block for each object image on the base. The blocks may be movable relative to the base. Moreover, each matching block may have a plurality of sides, and the sides of a given matching block may have different indicia thereon representative of different cognitive matching skill levels with respect to the corresponding object image on the base.

21 Claims, 3 Drawing Sheets

COGNITIVE MATCHING SKILL LEARNING AID AND RELATED METHODS

FIELD OF THE INVENTION

The present invention relates to the field of educational aids, and, more particularly, to learning aids for cognitive matching skills and related methods.

BACKGROUND OF THE INVENTION

One very effective method for teaching children the basic educational skills necessary to read, write, and use mathematics is through association. Generally speaking, at an early age children can begin to develop basic skills such as sorting objects based upon size, color, shape, etc., or matching similar objects together. These basic skills then provide the foundation for children to begin associating letters with their respective sounds and numbers with respective quantities of objects, for example. From there, children may then progress to the more advanced skills of reading, writing, and the use of mathematics.

Children's games and toys have long been used to help teach children these important association skills. One example of a toy which helps young children develop sorting skills is toy blocks. Such blocks may come in a variety of shapes, colors, etc., which allow children to sort the blocks as they play. Other games, such as card games, may also be used for teaching matching skills. One such card game is concentration, in which several pairs of matching cards are arranged face down in rows and columns in a random order. Only two cards may be turned face up at the same time, and the player keeps turning up cards until all of the pairs are matched together. Such games thus teach children not only how to match two similar objects but also help develop memory skills.

One particular example of an educational word and letter game is disclosed in U.S. Pat. No. 5,743,740 to Visser et al. The educational game, which is based upon the popular "bingo" game, includes participant boards and a plurality of cards. The boards include a plurality of rows and columns defining boxes at their intersections, and the boxes each have a letter, word, or picture printed therein. Each card has one of letters, words, numbers, symbols, or pictures imprinted thereon that correspond to the participant's boards. An instructor reads aloud the card and gives a brief explanation of the card's contents. When a participant recognizes the card's contents on his board, he will cover the respective box with a marker (e.g., a bean). The object of the game is to complete a row or other predetermined sequence of boxes prior to another participant. Also, different boards having increasingly more advanced indicia thereon may be used along with corresponding sets of cards for different skill levels.

While the above prior art game may prove helpful in developing matching skills, it may be disadvantageous in certain applications as it requires numerous boards and card sets be used to teach different skill levels. Moreover, because the game requires the use of markers which may be relatively small, this game may only be suitable for older children (i.e., several years of age) and not toddlers, for example.

SUMMARY OF THE INVENTION

In view of the foregoing background, it is therefore an object of the present invention to provide and educational aid for learning cognitive matching skills.

This and other objects, features, and advantages in accordance with the present invention are provided by a cognitive matching skill learning aid which may include a base having a plurality of different object images thereon and a respective matching block for each object image on the base. The blocks may be movable relative to the base. Moreover, each matching block may have a plurality of sides, and the sides of a given matching block may have different indicia thereon representative of different cognitive matching skill levels with respect to the corresponding object image on the base. Thus, a single base and set of matching blocks may advantageously be used for teaching progressively more advanced matching skills to children as they grow and reach new developmental levels, for example.

More particularly, the indicia on each matching block may be one of the following: the respective object image for the matching block; a name of the respective object image for the matching block; and at least one of an upper case initial letter of a name of the respective object image for the matching block and a lower case initial letter of the name of the respective object image for the matching block. Furthermore, one of the indicia on each matching block may be an arbitrary indicia for grouping matching blocks based upon common characteristics between respective object images thereof.

In particular, the arbitrary indicia may be colors, and the common characteristics may include at least one of names of the object images beginning with long vowel sounds, names of the object images beginning with short vowel sounds, names of the object images beginning with consonants, and object images corresponding to numbers. Thus, by way of example, red indicia on a side of a matching block may correspond to object images with names beginning with short vowel sounds, blue indicia may correspond to object image names beginning with long vowel sounds, yellow indicia may correspond to numbers, etc.

Additionally, object images having names beginning with long vowel sounds may be positioned adjacent a center of the base. Also, object images having names beginning with short vowel sounds and consonants may be positioned adjacent a periphery of the base. The learning aid may also include a plurality of legs supporting the base. That is, the base could be a table top or a chair/stool seat, for example. Alternately, the base may be made of cardboard to provide a more portable "board game" style leaning aid.

A method aspect of the invention is for teaching cognitive matching skills and may include providing a base and matching blocks therefor as briefly described above, for example. The method may also include positioning matching blocks on the base adjacent respective object images based upon one of the indicia on the matching blocks.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
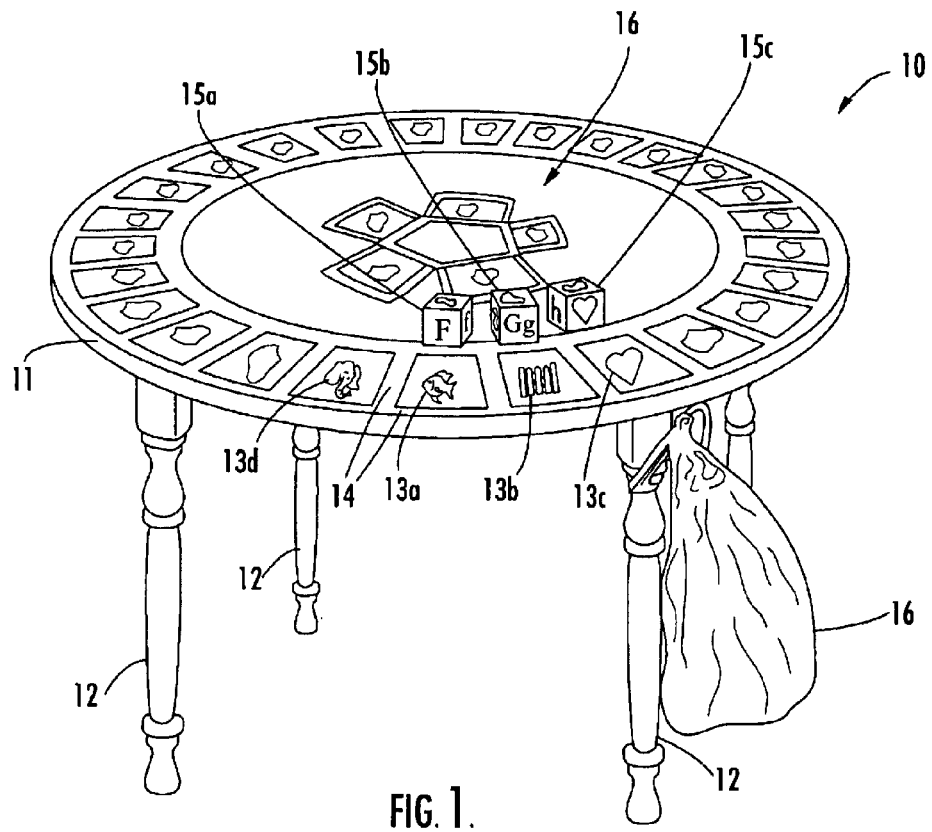
FIG. 1 is a perspective view of a cognitive matching skill learning aid in accordance with the present invention.
Figure 2:
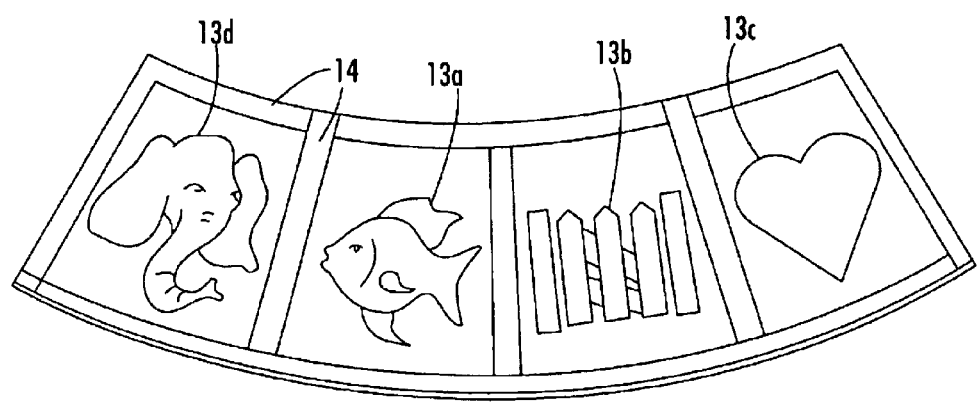
FIG. 2 is top view of a portion of the learning table of FIG. 1 illustrating certain object images on the base thereof in greater detail.

Referring initially to FIGS. 1 and 2, a cognitive matching skill learning aid 10 in accordance with the present invention is now described. More particularly, in the illustrated embodiment the learning aid 10 is a table including a base 11 and a plurality of legs 12 supporting the base. The base 11 has a plurality of different object images 13 thereon. Dividing lines 14 are also included on the base in the illustrated example for demarcating the object images 13 one from another. Of course, dividing lines 14 need not be included in all embodiments.

The learning aid 10 also includes matching blocks 15 which correspond to the object images 13. Preferably, the learning aid 10 will include a respective matching block 15a, 15b, 15c, etc. for each object image 13a (fish), 13b (gate), 13c (heart), etc. on the base 11, as will be described further below. The matching blocks 15 may be made of any suitable material (e.g., plastic, wood, etc.) and are illustratively shown as cubes, but other suitable shapes may also be used. Moreover, the matching blocks 15 are also movable relative to the base 11. As such, the matching blocks 15 may be conveniently stored in a bag 16 or other suitable container either at the learning aid 10 (e.g., hung from a hook on the table as illustrated in FIG. 1) or elsewhere.

Figure 3:
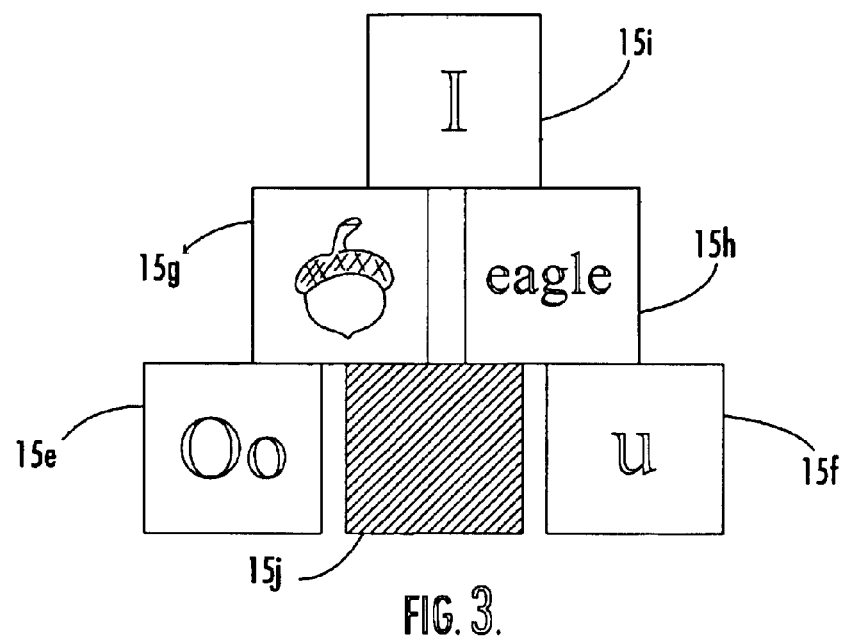
FIG. 3 is a side view of various matching blocks for use with the learning table of FIG. 1.
Figure 4:
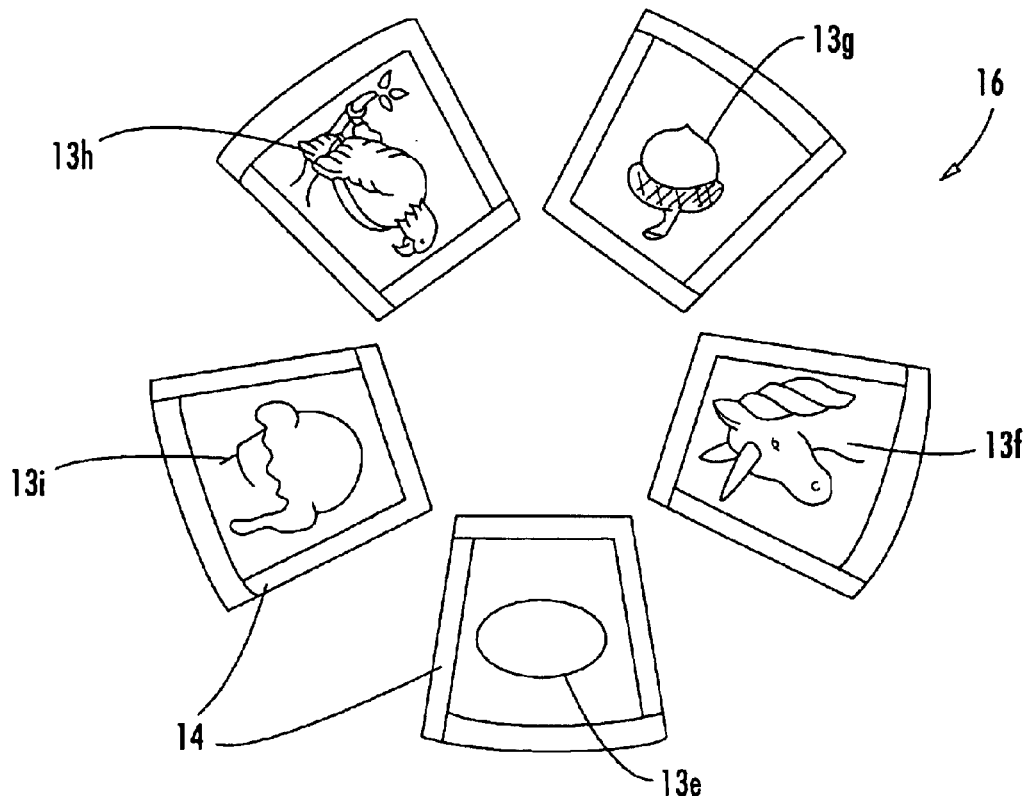
FIG. 4 is a top view similar to FIG. 2 illustrating a particular grouping of the object images of the table of FIG. 1.

In accordance with the invention, each matching block 15 has a plurality of sides, and the sides of a given matching block have different indicia thereon representative of different cognitive matching skill levels with respect to the corresponding object image 13 on the base 11. Referring additionally to FIGS. 3 and 4, one of the indicia on each matching block 15 is preferably the respective object image 13 for the matching block, as seen particularly on matching block 15g (acorn). Other indicia corresponding to more advanced matching skill levels may be seen on the matching blocks 15e, 15f, 15h, and 15i. In particular, these include a name of the respective object image for the matching block (e.g., "eagle" on the matching block 15h), an upper or lower case initial letter of the name of the respective object image for the matching block (e.g., "I" and "u" on the matching blocks 15i and 15f, respectively), or both an upper and lower case initial letter (e.g., "Oo" on the matching block 15e), for example.

It should be noted that each of the indicia on a given matching block 15 need not correspond directly to the respective object image 13 for that matching block. More particularly, one of the indicia on each matching block 15 may have an arbitrary indicia (i.e., a color) for grouping matching blocks based upon common characteristics between respective object images 13 thereof. By way of example, as seen on the matching block 15j there is a color corresponding to long vowel sounds. Similar common characteristics may include short vowel sounds and names that begin with consonants, for example, as will be described further below.

Referring particularly to FIG. 4, in accordance with the invention object images 13 may also be grouped using the above common characteristics and positioned as a group at a particular location on the base 11 to facilitate learning of a particular skill. In the present example, a group 16 of object images 13e (oval), 13f (unicorn), 13g (acorn), 13h (eagle), and 13i (ice cream cone) each having a name beginning with a long vowel sound is positioned adjacent the center of the base 11. The remaining object images 13, which have names beginning with short vowel sounds and consonants, are positioned adjacent a periphery of the base 11, as illustratively shown.

Thus, when it is desired to emphasize a particular skill, the matching blocks 15 may advantageously be sorted based upon the arbitrary indicia thereon corresponding to the desired skill (e.g., long vowel sounds), and the child may then look to the group 16 rather than have to search all of the object images 13 on the base 11. In this way, the child may more quickly associate the matching blocks 13 with the respective object images 13, which may in turn increase the child's self confidence and help keep the child from becoming frustrated. Of course, the group 16 is merely one possibility of how the objects images 13 may be grouped in accordance with the present invention, and numerous other groupings and arrangements of object images may also be used.

While the learning aid 10 is illustratively shown as a table in FIG. 1, it will be appreciated by those of skill in the art that the learning aid may be embodied in other forms. By way of example, the base 11 could be made from cardboard much like a board game to provide a more portable embodiment of the invention. Furthermore, as illustratively shown in FIG. 5, the base 11' could be a seat, such as for a chair or stool, for the child to sit on when not using the learning aid 10'. A particularly advantageous embodiment of the invention includes the tabletop base 11 (FIG. 1) and chair (or stool) seat bases 11' (FIG. 5) to accompany the table. Of course, other embodiments are possible, as will be appreciated by those of skill in the art.

Figure 5:
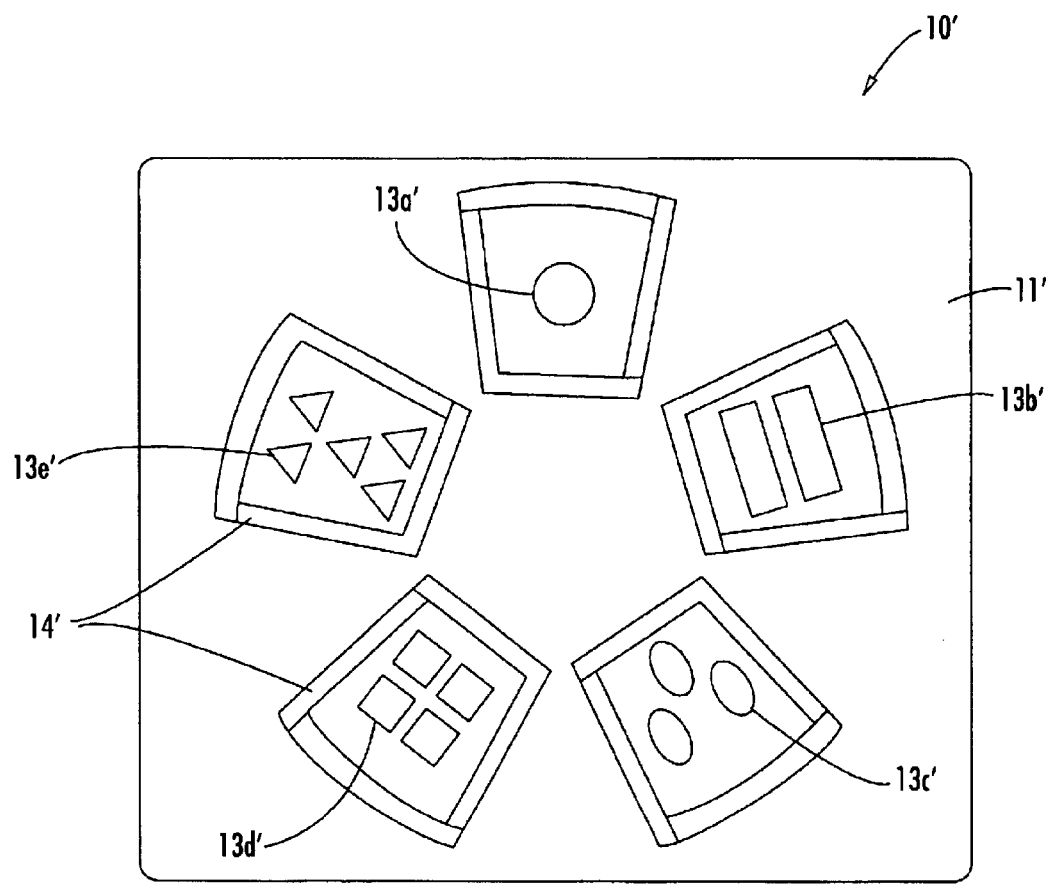
FIG. 5 is a top view similar to FIG. 2 illustrating object images in accordance with an alternate embodiment of the invention.

In the alternate embodiment of the learning aid 10' illustratively shown in FIG. 5, object images 13a'–13e' advantageously correspond to numbers to promote numeric matching and counting skills. More specifically, each of the object images 13a'–13e' has a particular number of shapes (i.e., one circle for the object image 13a', two rectangles for the object image 13b', three ovals for the object image 13c', four squares for the object image 13d', and five triangles for the object image 13e').

Figure 6:
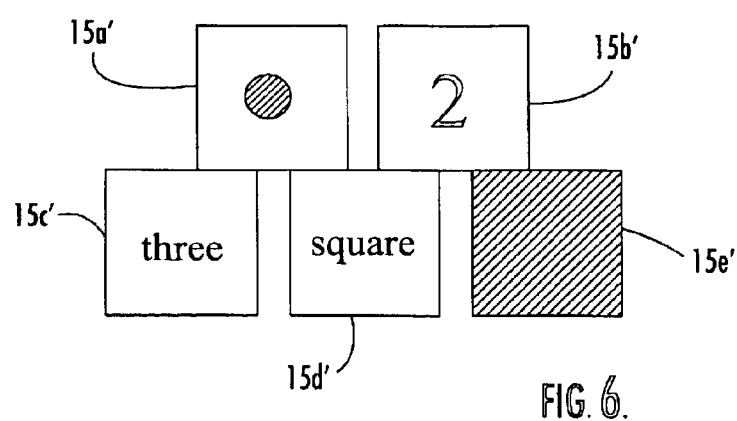
FIG. 6 is a side view similar to FIG. 3 illustrating respective matching blocks for the object images of FIG. 5.

Respective matching blocks 15a'–15e' for the object images 13a'–13e' (FIG. 6) may include the object image (matching block 15a'), the number of shapes in the object image (matching block 15b'), the name of the number of shape(s) in the object image (matching block 15c'), the name of shape in the object image (matching block 15d'), and an arbitrary indicia for sorting the matching number blocks (matching block 15e'), as described above. While shapes have been used in the present example for the object images 13', it will be appreciated that other types of object images may also be used to teach numerical association and counting skills.

It will also be appreciated that various combinations of the above embodiments are possible. For example, in the above described embodiment including both tables and chairs, the tabletop base 11 may have object images 13 corresponding to letters, and the chair seat base(s) 11' may have object images 13' corresponding to numbers thereon. Such a tabletop base 11 and chair seat base 11' design may advantageously be adapted and painted onto various children's table and chair sets.

Another possibility is to use a multi-sided base 11 which has the object images 13 one side thereof and the object images 13' on another side. Still further, both types of object images 13 and 13' could be on a same side of the base 11, 11', either in respective groups as described above or intermingled. The remaining elements illustrated in FIGS. 5 and 6 and not specifically mentioned herein are similar to those described above and will therefore not be discussed further.

The present invention will be further understood with respect to an exemplary embodiment and directions for the use thereof, which are described below.

EXAMPLE

For the present example, the learning aid 10 includes a table and two chairs each with respective bases 11 and 11'. In particular, the tabletop base 11 is similar to that illustrated in FIG. 1 and includes the group 16, and the chair seat bases 11' have object images 13' thereon similar to those discussed with respect to FIG. 5, as will be described further below. Accordingly, this exemplary embodiment includes thirty-one painted matching blocks 13 for the tabletop base 11 and ten matching blocks 13' for the chair seat bases 11' (i.e., forty-one blocks total).

The exemplary embodiment is designed to teach seventeen reading readiness skills and eight math readiness skills to children ages 2–6, for example. In particular, the periphery of the tabletop base 11 is divided into twenty-six equal sections by the dividing lines 14, and each of the sections is about four inches deep. The top edge of each section is outlined with a one-half inch strip of red paint. The bottom edge of each section is outlined with a one-half inch strip of blue paint. The sides of each section are outlined by alternating one-half inch strips of yellow and green paint. There are five similarly shaped, evenly spaced, identically outlined sections centered in the middle of the tabletop base 11. Of course, other colors and section sizes may also be used.

Object images 13 are painted in each of the twenty-six perimeter sections which correspond to the five short vowel sounds and each of the twenty-one consonant sounds in the English alphabet. In this exemplary embodiment, these object images 13 are as follows preceded by the letter they represent: A—apple; B—ball; C—cat; D—dog; E—elephant; F—fish; G—gate; H—horse; I—igloo; J—jelly; K—kite; L—lion; M—mouse; N—nest; O—octopus; P—pig; Q—quilt; R—ring; S—seal; T—turtle; U—umbrella; V—vase; W—worm; X—x-ray; Y—yoyo; and Z—zebra. The five center sections are painted with object images 13e–13i (i.e., the group 16) (FIG. 4) representing the long vowel sounds as follows: O—oval; U—unicorn; A—acorn; E—eagle; and I—ice cream.

Each chair seat base 11' has five similarly shaped, evenly spaced, identically outlined sections. Each section on the first chair seat base 11' has either circles, rectangles, squares, triangles, or ovals painted therein in quantities of one through five (FIG. 5). Each section on the second chair seat base 11' also has either circles, rectangles, squares, triangles or ovals in quantities of six through ten painted therein. The forty-one manipulative blocks 13, 13' are stored in the bag 16 (e.g., a twill drawstring bag) that hangs from a blunt wooden peg (e.g., 1½-inch long) on one leg of the table when not in use. Each matching block 15, 15' is a wooden cube approximately 1½-inches tall.

Furthermore, one face of each of the thirty-one matching blocks 15 is painted with a miniature version of a respective one of the thirty-one object images 13 on the tabletop base 11, as described above. Similarly, the ten object images 13' are each painted on one face of the respective matching blocks 15'. The matching blocks 15, 15' have color-coded grouping indicia as follows: red—short vowel sounds; blue—long vowel sounds; green—consonant sounds; and yellow—numbers.

The six faces of a matching block 15 for the letter "B" are as follows: face one—solid green; face two—a ball; face three—the word "ball;" face four—an upper case "B;" face five—a lower case "b;" and face six—an upper and lower case "Bb." Each of the remaining thirty matching blocks 15 is painted in a similar manner to a respective object image 13 on the tabletop base 11. Similarly, the six faces of the matching block 15a' for the number "1" are as follows: face one—solid yellow; face two—a circle; face three—the word "one;" face four—the number 1; face five—the word "circle;" face six—blank. The remaining nine matching blocks 15' are painted in a similar manner to a respective object image 13' on one of the chair seat bases 11'.

It should be noted that the above described designs may be painted in primary colors, pastel colors, or custom colors, and all paints and finishes are preferably non-toxic and child safe. Of course, other methods known to those of skill in the art for applying the object images 13, 13' to their respective bases 11 may also be used. In fact, colors need not even be used in certain embodiments, and the objects images 13, 13' and/or matching blocks 15, 15' could be engraved, for example.

Directions for using the above exemplary embodiment will now be described. The following reading readiness activities and tasks to completed at the bases 11, 11' are listed in order of difficulty beginning with the simplest and ending with the most complex. It is suggested that the activities be introduced in the order listed and that a new activity not be introduced until the previous activity has been mastered to about 80% accuracy. Activities should continue to be reviewed even after mastery. It should be noted that letters are not named until later in the activities. Beginning activities are completed using letter sounds as heard at the beginning of each object image 13, 13' name. The activities/tasks are as follows:

1. Sort the matching blocks 15, 15' according to color.
2. Name each object image 13, 13' around the periphery of the tabletop base 11 beginning with the apple. Emphasize the sound heard at the beginning of each picture but do not name the letter it begins with. For example say, "Zzzz, zebra" not "Z, zebra." (Do not do the long vowel sounds in the center of the table at this time.)
3. Using the green and red matching blocks 15, have the child match the appropriate matching block to the appropriate object image 13 by using the corresponding object images on the blocks. Each time there is a match, say the phonetic sound heard at the beginning of each object image 13 name followed by the object image name, e.g., "Ssss, seal."
4. Using the green and red matching blocks 15, have the child match the appropriate matching block to the appropriate object image 13 by using the double-letter side of the matching block. (Aa, Bb, Cc, etc.) Each time there is a match, say the phonetic sound heard at the beginning of each object image 13 name followed by the object name, e.g., "Vvvv, vase."

5. Using the same matching blocks 15, let the child match the appropriate matching block to the respective object image 13 by using the other two, single letter sides of the blocks. (a, b, c, d, or A, B, C, D, etc.) Again, say the phonetic sound of the initial letter of the name of the object image 13 followed by the name thereof.

6. Now it is time to introduce the names of the letters. Use the green and red matching blocks 15 only and begin with Aa. Show the child the double letter side. Say the name of the letter followed by the sound it makes at the beginning of the object image 13 on the respective matching block 15 without saying the name of the object image, e.g., "A, aaa." Preferably, progression to the next activity should be postponed until this particular activity is substantially completely mastered. This will avoid confusion and frustration for the child. Please note that the sound the letter "x" makes most often in reading is "cks" (e.g., as at the end of "box") and should be taught as such. It should be noted that the tabletop base 11 may used in this activity, but does not have to be.

7. Continue in the same manner as in activity 6 using either of the single letter sides of the matching blocks 15 (a, b, c or A, B, C). For this activity, the tabletop base 11 need not be used, and the activity is preferably continued until the child can correctly name each letter and its sound without using the picture reference.

8. Now you can begin combining letter sounds to make words. When you put the letter "a" with the letter "t," you get -at. When you introduce this to the child, use the letter sounds, not the names. Say each sound alone and then slowly blend them together. Using "at" as the base, the child can recognize the words cat, bat, fat, hat, mat, pat, rat, sat, and vat. Again, say the first sound alone and then slowly blend it with the base sound "at." Simple base sounds that can teach word groups include -at, -an, -ad, -am, -ack, -en, -et, -ell, -est, -end, -ent, -in, -it, -is, -ig, -ip, -ill, -ick, -ob, -od, -op, -ot, -ox, -ock, -un, -ud, -up, -ut, -ug, -ump, and -ust.

9. Whenever the child expresses an interest, match the words on the matching blocks 15 to the appropriate object image 13.

The following activities are reading readiness skills that use the long vowel sounds and matching blocks 15e–15i. That is, only the matching blocks 15 having blue indicia on a face thereof should be used for the following activities. There are some phonics rules to remember that will make using the long vowel sounds easier. It should be noted that there are exceptions to these general rules which parents may wish to teach separately. The phonics rules are as follows:

1. When a word ends with "e," the vowel preceding it is often long such as the "a" heard in "late."

2. When two vowels are side by side, the first is usually long and the second is silent such as in the words boat, meat, doe, and lie.

The activities which include long vowel sound are as follows:

1. Name the long vowel object images 13e–13i in the center of the tabletop base 11 saying the first letter of the name thereof (which is the long vowel sound) followed by the name of the object image, e.g., "a—acorn, e—eagle, i—ice cream, o—oval, u—unicorn."

2. Have the child match the blue sided matching blocks 15 to the long vowel object images 13e–13i on the tabletop base 11 using the respective object images on the matching block.

3. Have the child match the matching blocks 15 to the long vowel object images 13e–13i on the tabletop base 11 using the double letter sides.

4. Have the child match the matching blocks 15 to the long vowel object images 13e–13i on the tabletop base 11 using either of the single letter sides.

5. Teach the child the first long vowel rule listed above. Use word groups he/she knows from activity 7 above. For example, show the child how the words hat, mat, mad, and tot, become hate, mate, made, and tote when the ending "e" rule is applied.

6. Teach the child the second long vowel rule listed above. For example, the "e" sound we hear in met, becomes long if we change met to meet or meat.

7. Base sounds with long vowel sounds that can teach word groups include -aid, -ail, -ate, -ake, -ame, -ay, -ee, -eet, -eat, -eam, -eed, -ead, -eal, -ie, -ive, -ide, -o, -oat, -oke, -ote, -oast, -ope, -une, -ule, and -ute.

8. Whenever the child expresses and interest, match the words on the matching blocks 15 to the appropriate long vowel object image 13e–13i.

After mastering the activities above, the child may wish to spell words using his/her blocks. Remember there are letter combinations that will sometimes change the sound a letter usually makes. The following activities may be introduced at any point and need not be utilized in any specific order:

1. Have the child describe one of the object image 13, 13' subjects.

2. Have the child tell you a story about one of the object image 13, 13' subjects.

3. Have the child dictate a sentence to you about one of the object image 13, 13' subjects. Read the sentence back to the child. As the child hears the sentence repeated, he will begin to attempt to read the sentence himself. Encourage and help him to read it accurately.

4. Have the child dictate a story about one of the object image 13, 13' subjects. Make the story into a little book. Encourage him to share and read the book.

5. Have the child draw object images 13, 13' to illustrate his sentences and stories.

The following activities are math readiness skills that can be developed using the chair seat bases 11'. Activities should preferably be completed in the order given below for best results. These activities are for use with the yellow-sided matching blocks 15'.

1. Have the child count the matching blocks 15'.

2. Have the child count the shapes inside each section on each chair seat base 11'.

3. Have the child match the appropriate matching block 15' using the shape side thereof to the appropriate object image 13' on the chair seat bases 11'. Count the shapes on each matching block 15' and on the chair seat bases 11' as you work.

4. Have the child identify the shape inside each section on each chair seat base 11', i.e., circle, square, triangle, rectangle, and oval.

5. Have the child match the appropriate number (e.g., 1, 2, 3, etc.) to the appropriate object image 13'.

6. Have the child place the matching blocks 15' in order using the numbers 1–10 thereon.

7. Have the child match the appropriate matching block 15' to the appropriate object image 13' using the name of the number.

8. Use the matching blocks 15' themselves or the shape side to introduce simple addition, such as, 1+3=4. Say something like, "I have one block, and you have three. Lets put them together and see how many blocks we have all together."

It will be appreciated by those of skill in the art that numerous object images 13, 13' and indicia other than those described above may also be used in accordance with the present invention. Further, object images 13, 13' could correspond to names and numbers in languages other than English.

A method aspect of the invention is for teaching cognitive matching skills and may include providing a base 11, 11' and matching blocks 15, 15' as described above, for example. The method may include positioning the matching blocks 15, 15' on the base 11, 11', respectively, adjacent respective object images 13, 13' based upon one of the indicia on the matching blocks, as described further above. Other method aspects of the invention will be apparent to those of skill in the art based upon the foregoing description and will therefore not be discussed further herein.

Accordingly, the present invention advantageously allows one or more bases 11, 11' to be used with a single set of matching blocks 15, 15' for teaching progressively more advanced matching skills to children as they grow and reach new developmental levels, for example. Thus, parents need not purchase multiple learning toys, games, etc. each time a child's cognitive matching skills increase during their early developmental years (e.g., ages 2–6), which may be particularly important given the vast amount of learning that takes place during this time. Moreover, the matching blocks 15, 15' of the present invention may be manufactured to a size that is safe for children to begin playing with at even younger ages.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cognitive matching skill learning aid comprising:
   a base having a plurality of different object images thereon, object images having names beginning with long vowel sounds being positioned adjacent a center of the base, and object images having names beginning with short vowel sounds and consonants being positioned adjacent a periphery of the base; and
   a respective matching block for each object image on said base and being movable relative to said base;
   each matching block having a plurality of sides, the sides of a given matching block having different indicia thereon representative of different cognitive matching skill levels with respect to the corresponding object image on said base.

2. The learning aid of claim 1 wherein one of the indicia on each matching block comprises the corresponding object image on said base for said matching block.

3. The learning aid of claim 1 wherein one of the indicia on each matching block comprises a name of the respective object image for said matching block.

4. The learning aid of claim 1 wherein one of the indicia on each matching block comprises at least one of an upper case initial letter of a name of the respective object image for said matching block and a lower case initial letter of the name of the respective object image for said matching block.

5. The learning aid of claim 1 wherein one of the indicia on each matching block comprises an arbitrary indicia for grouping matching blocks based upon common characteristics between respective object images thereof.

6. The learning aid of claim 5 wherein the common characteristics comprise at least one of names of the object images beginning with long vowel sounds, names of the object images beginning with short vowel sounds, names of the object images beginning with consonants, and object images corresponding to numbers.

7. The learning aid of claim 5 wherein the arbitrary indicia comprise colors.

8. The learning aid of claim 1 further comprising a plurality of legs supporting said base.

9. A cognitive matching skill learning aid comprising:
   a table comprising a plurality of legs and a base carried thereby, said base having a plurality of different object images thereon, object images having names beginning with long vowel sounds being positioned adjacent a center of the base, and object images having names beginning with short vowel sounds and consonants being positioned adjacent a periphery of the base; and
   a respective matching block for each object image on said base and being movable relative to said base;
   each matching block having a plurality of sides, the sides of a given matching block having different indicia thereon representative of different cognitive matching skill levels with respect to the corresponding object image on said base, and one of the indicia on each matching block comprising an arbitrary indicia for grouping matching blocks based upon common characteristics between respective object images thereof.

10. The learning aid of claim 9 wherein one of the indicia on each matching block comprises the corresponding object image on said base for said matching block.

11. The learning aid of claim 9 wherein one of the indicia on each matching block comprises a name of the respective object image for said matching block.

12. The learning aid of claim 9 wherein one of the indicia on each matching block comprises at least one of an upper case initial letter of a name of the respective object image for said matching block and a lower case initial letter of the name of the respective object image for said matching block.

13. The learning aid of claim 9 wherein the common characteristics comprise at least one of names of the object images beginning with long vowel sounds, names of the object images beginning with short vowel sounds, names of the object images beginning with consonants, and object images corresponding to a number.

14. The learning aid of claim 9 wherein the arbitrary indicia comprise colors.

15. A method for teaching cognitive matching skills comprising:
   providing a base having a plurality of different object images thereon, object images having names beginning with long vowel sounds being positioned adjacent a center of the base, and object images having names beginning with short vowel sounds and consonants being positioned adjacent a periphery of the base;
   providing a respective matching block for each object image on the base and being movable relative to the base, each matching block having a plurality of sides, the sides of a given matching block having different indicia thereon representative of different cognitive matching skill levels with respect to the corresponding object image on the base; and
   positioning matching blocks on the base adjacent respective object images based upon one of the indicia on the matching blocks.

16. The method of claim 15 wherein one of the indicia on each matching block comprises the corresponding object image on said base for the matching block.

17. The method of claim 15 wherein one of the indicia on each matching block comprises a name of the respective object image for the matching block.

18. The method of claim 15 wherein one of the indicia on each matching block comprises at least one of an upper case initial letter of a name of the respective object image for the matching block and a lower case initial letter of the name of the respective object image for the matching block.

19. The method of claim 15 wherein one of the indicia on each matching block comprises an arbitrary indicia corresponding to a characteristic of the respective object image of the matching block; and further comprising grouping matching blocks based upon the arbitrary indicia prior to positioning the matching blocks.

20. The method of claim 19 wherein the characteristics of the object images comprise at least one of names of the object images beginning with long vowel sounds, names of the object images beginning with short vowel sounds, names of the object images beginning with consonants, and object images corresponding to a number.

21. The method of claim 19 wherein the arbitrary indicia comprise colors.

* * * * *